United States Patent
Lee et al.

(10) Patent No.: US 11,924,780 B2
(45) Date of Patent: Mar. 5, 2024

(54) METHOD FOR RECEIVING PHASE TRACKING REFERENCE SIGNAL BY TERMINAL IN WIRELESS COMMUNICATION SYSTEM AND APPARATUS SUPPORTING SAME

(71) Applicant: LG Electronics Inc., Seoul (KR)

(72) Inventors: Kilbom Lee, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 997 days.

(21) Appl. No.: 16/754,638

(22) PCT Filed: Oct. 4, 2018

(86) PCT No.: PCT/KR2018/011729
§ 371 (c)(1),
(2) Date: Aug. 13, 2020

(87) PCT Pub. No.: WO2019/074237
PCT Pub. Date: Apr. 18, 2019

(65) Prior Publication Data
US 2023/0115798 A1    Apr. 13, 2023

Related U.S. Application Data

(60) Provisional application No. 62/625,350, filed on Feb. 2, 2018, provisional application No. 62/593,150, filed (Continued)

(30) Foreign Application Priority Data

Oct. 4, 2018    (KR) .................. 10-2018-0118046

(51) Int. Cl.
H04B 7/185     (2006.01)
H04L 5/00      (2006.01)
(Continued)

(52) U.S. Cl.
CPC ......... *H04W 52/367* (2013.01); *H04L 5/0051* (2013.01); *H04W 52/325* (2013.01)

(58) Field of Classification Search
CPC ............. H04W 52/367; H04W 52/325; H04W 52/362; H04W 52/16; H04W 52/143; H04W 52/322; H04L 5/0051
(Continued)

(56) References Cited

U.S. PATENT DOCUMENTS 10,785,005 B2 *  9/2020  Lee ..................... H04W 72/541
10,911,197 B2 *  2/2021  Wang ................... H04L 5/0042
(Continued)

FOREIGN PATENT DOCUMENTS

CN      103891166    6/2014
EP        3541002    9/2019
WO   WO 2013/151395  10/2013

OTHER PUBLICATIONS

Huawei, HiSilicon, "Further details of PTRS," R1-1717306, 3GPP TSG RAN WG1 Meeting #90bis, Prague, Czech Republic, dated Oct. 9-13, 2017, 13 pages.
(Continued)

*Primary Examiner* — Amancio Gonzalez
(74) *Attorney, Agent, or Firm* — Fish & Richardson P.C.

(57) ABSTRACT

Disclosed are a method for receiving a phase tracking reference signal by a terminal in a wireless communication system and an apparatus supporting the same. According to one embodiment applicable to the present invention, a terminal may receive a phase tracking reference signal from multiple demodulation reference signal port groups on the basis of information on whether power boosting is applied to a phase tracking reference signal according to the number of layers of each of the multiple demodulation reference signal port groups from a base station.

14 Claims, 12 Drawing Sheets

Related U.S. Application Data on Nov. 30, 2017, provisional application No. 62/592,401, filed on Nov. 29, 2017, provisional application No. 62/571,751, filed on Oct. 12, 2017.

(51) Int. Cl.
  *H04W 52/32* (2009.01)
  *H04W 52/36* (2009.01)

(58) Field of Classification Search
  USPC .......................................................... 370/318
  See application file for complete search history.

(56) References Cited

U.S. PATENT DOCUMENTS

| | | | | |
|---|---|---|---|---|
| 10,972,238 | B2* | 4/2021 | Zhang | H04W 72/0446 |
| 11,006,387 | B2* | 5/2021 | Ko | H04L 5/0053 |
| 11,108,440 | B2* | 8/2021 | Cha | H04L 5/0051 |
| 11,115,943 | B2* | 9/2021 | Ko | H04L 5/10 |
| 11,121,743 | B2* | 9/2021 | Zhang | H04B 10/6165 |
| 11,206,624 | B2* | 12/2021 | Ko | H04W 76/27 |
| 11,394,501 | B2* | 7/2022 | Yeo | H04B 7/26 |
| 11,601,240 | B2* | 3/2023 | Liu | H04W 72/23 |
| 11,637,666 | B2* | 4/2023 | Grant | H04L 5/0023 370/329 |
| 2022/0353026 | A1* | 11/2022 | Yeo | H04W 72/23 |

OTHER PUBLICATIONS

MCC Support, "Final Report of 3GPP TSG RAN WG1 #AH_NR3 v1.0.0 (Nagoya, Japan, Sep. 18-21, 2017)," R1-1716942, 3GPP TSG RAN WG1 Meeting #90bis, Prague, Czech Rep, dated Oct. 9-13, 2017, 104 pages.

EP Extended European Search Report in European Appln. No. 18866593.9, dated Jun. 8, 2021, 8 pages.

Huawei, HiSilicon, "Further details of PTRS," R1-1716724, 3GPP TSG RAN WG1 NR Ad-Hoc#3, Nagoya, Japan, dated Sep. 18-21, 2017, 12 pages.

LG Electronics, "On UL PT-RS design," R1-1710297, 3GPP TSG RAN WG1 Meeting NR Ad-Hoc #2, Qingdao, P.R. China, dated Jun. 27-30, 2017, 6 pages.

3rd Generation Partnership Project; Technical Specification Group Radio Access Network; NR; "Physical layer procedures for data (Release 15)," 3GPP TS 38.214 V1.0.1, dated Sep. 2017, 38 pages, R1-1716930.

InterDigital, Inc., "Remaining issues on PT-RS," R1-1718825, 3GPP TSG RAN WG1 Meeting R1#90bis, Prague, Czech Republic, dated Oct. 9-13, 2017, 7 pages.

Nokia, Nokia Shanghai Bell, "On remaining details of PT-RS design," R1-1718517, 3GPP TSG RAN WG1 #90bis, Prague, Czech Republic, dated Oct. 9-13, 2017, 10 pages.

NTT Docomo, Inc., "Remaining details on PT-RS," R1-1718199, 3GPP TSG RAN WG1 Meeting #90bis, Prague, Czech Republic, dated Oct. 9-13, 2017, 12 pages.

PCT International Search Report and Written Opinion in International Application No. PCT/KR2018/011729, dated Jan. 16, 2019, 21 pages (with English translation).

Samsung, "Discussion on PT-RS," R1-1717631, 3GPP TSG RAN WG1 Meeting 90bis, Prague, CZ, dated Oct. 9-13, 2017, 9 pages.

Office Action in Chinese Appln. No. 201880079576.8, dated Dec. 30, 2022, 18 pages (with English translation).

Intel et al., "Way forward on PT-RS antenna port association," R1-1714977, 3GPP TSG RAN WG1 Meeting #90, Prague, Czechia, dated Aug. 21-25, 2017, 3 pages.

KR Notice of Allowance in Korean Appln. No. 10-2018-0118046, dated Mar. 10, 2021, 4 pages (with English translation).

Panasonic, "PT-RS design," R1-1717779, 3GPP TSG RAN WG1 Meeting #90bis, Prague, Czechia, dated Oct. 9-13, 2017, 9 pages.

Vivo, "Discussion on the remaining details on PT-RS," R1-1715624, 3GPP TSG RAN WG1 NR Ad Hoc #3, Nagoya, Japan, dated Sep. 18-21, 2017, 3 pages.

\* cited by examiner (a)

(b)

METHOD FOR RECEIVING PHASE TRACKING REFERENCE SIGNAL BY TERMINAL IN WIRELESS COMMUNICATION SYSTEM AND APPARATUS SUPPORTING SAME

CROSS-REFERENCE TO RELATED APPLICATIONS

This application is a National Stage application under 35 U.S.C. § 371 of International Application No. PCT/KR2018/011729, filed on Oct. 4, 2018, which claims the benefit of Korean Application No. 10-2018-0118046, filed on Oct. 4, 2018, U.S. Provisional Application No. 62/625,350, filed on Feb. 2, 2018, U.S. Provisional Application No. 62/593,150, filed on Nov. 30, 2017, U.S. Provisional Application No. 62/592,401, filed on Nov. 29, 2017, and U.S. Provisional Application No. 62/571,751, filed on Oct. 12, 2017. The disclosures of the prior applications are incorporated by reference in their entirety.

TECHNICAL FIELD

The present disclosure relates to a wireless communication system, and more particularly, to a method of receiving a phase tracking reference signal by a user equipment in a wireless communication system and device for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

DISCLOSURE

Technical Problem

The object of the present disclosure is to provide a method of receiving a phase tracking reference signal by a user equipment in a wireless communication system and devices for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method of receiving a phase tracking reference signal (PT-RS) by a user equipment in a wireless communication system and devices for supporting the same.

In an aspect of the present disclosure, provided herein is a method of receiving a phase tracking reference signal (PT-RS) by a user equipment (UE) in a wireless communication system. The method may include: receiving, from a base station, information on whether PT-RS power boosting based on the number of layers for each of a plurality of demodulation reference signal (DM-RS) port groups is applied; and receiving the PT-RS based on a PT-RS power boosting level of each of the DM-RS port groups. The PT-RS power boosting level of each of the DM-RS port groups may be determined based on the received information.

The PT-RS power boosting level of a specific DM-RS port group may refer to a power boosting level for the PT-RS transmission power of the specific DM-RS port group with respect to the transmission power of one layer of a physical downlink shared channel (PDSCH) belonging to the specific DM-RS port group.

The received information may indicate whether the PT-RS power boosting based on the number of layers is applied to each of the plurality of DM-RS port groups.

In an example of the present disclosure, when the received information indicates that the PT-RS power boosting based on the number of layers is applied to a specific DM-RS port group, the PT-RS received from the specific DM-RS port group may be received at a power boosting level ($P_1$) satisfying Equation 1 below.

$$P_1 = X + Y \text{(dB)} \qquad \text{[Equation 1]}$$

Alternatively, when the received information indicates that the PT-RS power boosting based on the number of layers is not applied to the specific DM-RS port group, the PT-RS received from the specific DM-RS port group may be received at a power boosting level ($P_2$) satisfying Equation 2 below.

$$P_2 = X \text{(dB)} \qquad \text{[Equation 2]}$$

In Equations 1 and 2, X denotes a PT-RS power boosting level based on the number of PT-RS ports, and Y denotes a PT-RS power boosting level based on the number of layers for the specific DM-RS port group.

In this example, when the number of PT-RS ports is 2, the value of X may be set to 3 dB.

When the number of layers for the specific DM-RS port group is 2, the value of Y may be set to 3 dB. When the number of layers for the specific DM-RS port group is 3, the value of Y may be set to 4.77 dB. When the number of layers for the specific DM-RS port group is 4, the value of Y may be set to 6 dB.

In another example of the present disclosure, when the received information indicates that the PT-RS power boosting based on the number of layers is applied to a specific DM-RS port group, the PT-RS received from the specific DM-RS port group may be received at a power boosting level ($P_3$) satisfying Equation 3 below.

$$P_3 = \min(P_{MAX}, X + Y)\text{(dB)} \qquad \text{[Equation 3]}$$

Alternatively, when the received information indicates that the PT-RS power boosting based on the number of layers is not applied to the specific DM-RS port group, the PT-RS received from the specific DM-RS port group may be received at a power boosting level ($P_4$) satisfying Equation 4 below.

$$P_4 = \min(P_{MAX}, X^-)(dB) \qquad \text{[Equation 4]}$$

In Equations 3 and 4, X denotes a PT-RS power boosting level based on the number of PT-RS ports, Y denotes a PT-RS power boosting level based on the number of layers for the specific DM-RS port group, and $P_{MAX}$ denotes a power boosting threshold level configured by higher layer signaling. In this case, $P_{MAX}$ may be fixed to a specific value.

The information on whether the PT-RS power boosting based on the number of layers for each of the plurality of DM-RS port groups is applied may be received through higher layer signaling.

Alternatively, a transmission configuration indicator (TCI) may be applied as the information on whether the PT-RS power boosting based on the number of layers for each of the plurality of DM-RS port groups is applied.

The TCI may be received in downlink control information (DCI).

The TCI may indicate one of a plurality of predetermined TCI states for the plurality of DM-RS port groups.

The plurality of predetermined TCI states may be configured through higher layer signaling.

A parameter for informing whether the PT-RS power boosting based on the number of layers is applied, which is included in the plurality of TCI states, may be defined for each reference signal set corresponding to each of the plurality of DM-RS port groups.

The UE may receive the PT-RS on a PT-RS port associated with each DM-RS port group.

The PT-RS port associated with each DM-RS port group may be associated with a DM-RS port with the lowest index among DM-RS ports assigned to each DM-RS port group.

In another aspect of the present disclosure, provided herein is a UE for receiving a PT-RS in a wireless communication system. The UE may include a receiver and a processor connected to the receiver. The processor may be configured to: receive, from a base station, information on whether PT-RS power boosting based on the number of layers for each of a plurality of DM-RS port groups is applied; and receive the PT-RS from the plurality of DM-RS port groups based on a PT-RS power boosting level of each of the DM-RS port groups.

The PT-RS power boosting level of each of the DM-RS port groups may be determined based on the received information.

It will be understood by those skilled in the art that the above-described aspects of the present disclosure are merely part of the embodiments of the present disclosure and various modifications and alternatives could be developed from the following technical features of the present disclosure.

Advantageous Effects

As is apparent from the above description, the embodiments of the present disclosure have the following effects.

According to the present disclosure, when a UE receives a PT-RS from a plurality of DM-RS port groups in a wireless communication system to which the present disclosure is applicable, a PT-RS power boosting level may be accurately calculated for each DM-RS port group.

Specifically, when each of the plurality of DM-RS port groups has a different number of PDSCH layers, a different PT-RS power boosting level may need to be determined for each DM-RS port group. Otherwise, a base station power amplifier requires additional power, and this may increase hardware and management costs.

However, according to the present disclosure, a base station may determine the PT-RS power boosting level for each DM-RS port group with no requirement of additional power for an existing power amplifier.

In particular, according to the present disclosure, the PT-RS power boosting level of the base station may be defined between the BS and the UE in a predetermined way (e.g., a look-up table, etc.). Thus, the UE may be preconfigured with the PT-RS power boosting level of the base station (e.g., the UE may be configured with a specific row in the look-up table).

In this case, the UE may determine (or recognize) the PT-RS power boosting level of the base station based on the number of indicated DM-RS port groups and the number of PDSCH layers belonging to each group. That is, the PT-RS power boosting level of the base station may be determined without any signaling related to PT-RS power boosting from the perspective of the UE.

The mapping relationship between layers and radio frequency (RF) chains of the BS may vary depending on the implementation of the BS. For example, each RF chain of a first BS (e.g., four RF chains) may be mapped to all antenna ports of the BS. However, each RF chain of a second BS may be one-to-one mapped to each antenna port of the BS In this case, when transmitting a PT-RS through one layer, the first BS may boost the transmission power of the PT-RS by borrowing power of other layers.

On the other hand, when transmitting a PT-RS through one layer, the second BS may not boost the transmission power of the PT-RS since the second BS fails to borrow power of other layers.

As described above, the PT-RS power boosting based on different layers may not be enabled at all times depending on the implementation of the BS According to the present disclosure, when the UE receives information on whether PT-RS power boosting based on the number of layers for each of the plurality of DM-RS port groups is applied, the UE may receive the PT-RS by calculating (or recognizing) the PT-RS power boosting level for each of the plurality of DM-RS port groups more accurately.

It will be appreciated by persons skilled in the art that the effects that could be achieved with the present disclosure are not limited to what has been particularly described hereinabove and other advantages of the present disclosure will be more clearly understood from the following detailed description. That is, effects which are not intended by the present disclosure may be derived by those skilled in the art from the embodiments of the present disclosure.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE

Figure 1:
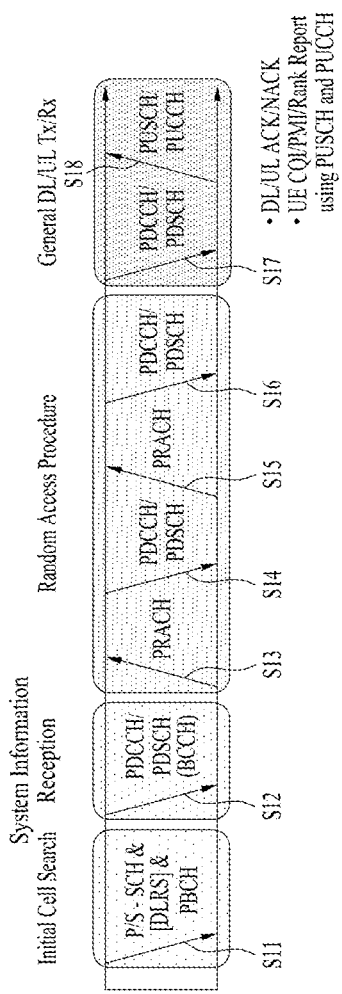
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

It is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, a 3GPP 5G new radio access technology (NR) system, and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331. That is, the steps or parts which are not described in the embodiments of the present disclosure to clearly reveal the technical features of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that may be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, the 3GPP NR system is explained as an example of a wireless access system to which the embodiments of the present disclosure are applicable.

The embodiments of the present disclosure may be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

While the embodiments of the present disclosure are described based on the 3GPP NR system to clarify the technical features of the present disclosure, the present disclosure is also applicable to other wireless systems (e.g., 3GPP LTE system, IEEE 802.16 system, IEEE 802.11 system, etc.).

1. NR System 1.1. Physical Channels and Signal Transmission and Reception Method Using the Same In a wireless access system, a UE receives information from a BS in DL and transmits information to the BS in UL. The information transmitted and received between the UE and the BS includes general data information and various types of control information. There are many physical channels depending on the types/usages of information transmitted and received between the UE and the BS.

FIG. 1 illustrates physical channels and a general signal transmission method using the physical channels, which are applicable to the embodiments of the present disclosure.

When a UE is powered on or enters a new cell, the UE performs an initial cell search (S11). The initial cell search involves acquisition of synchronization to a BS. Specifically, the UE synchronizes its timing with the BS and obtains information such as a cell Identifier (ID) by receiving a primary synchronization channel (P-SCH) and a secondary synchronization channel (S-SCH) from the BS.

Then, the UE may obtain information broadcast in the cell by receiving a physical broadcast channel (PBCH) from the BS.

During the initial cell search, the UE may monitor the state of a DL channel by receiving a DL reference signal (RS).

After completing the initial cell search, the UE may obtain more detailed system information by receiving a physical downlink control channel (PDCCH) and a physical downlink shared channel (PDSCH), which depends on information in the PDCCH (S12).

To complete access to the BS, the UE may perform a random access procedure (S13 to S16). To this end, the UE may transmit a preamble over a physical random access channel (PRACH) (S13) and receive a response message for the preamble over the PDCCH and the PDSCH associated therewith (S14). In the case of contention-based random access, the UE may additionally perform a contention resolution procedure including transmission of an additional PRACH signal (S15) and reception of a PDCCH signal and a PDSCH signal associated therewith (S16).

After completing the above procedure, the UE may perform reception of a PDCCH signal and/or a PDSCH signal (S17) and transmission of a physical uplink control channel (PUCCH) signal and a physical uplink shared channel (PUSCH) signal (S18) as a general UL/DL signal transmission procedure.

Control information transmitted from the UE to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix indicator (PMI), a rank indicator (RI), etc.

In the LTE system, the UCI may be periodically transmitted on the PUCCH in general. However, in some embodiments, the UCI may be transmitted on the PUSCH (if control information and traffic data need to be transmitted simultaneously). In addition, when receiving a request/command from a network, a UE may aperiodically transmit the UCI over the PUSCH.

1.2. Numerologies

The NR system to which the present disclosure is applicable supports various OFDM numerologies shown in the following table. In this case, the value of $\mu$ and cyclic prefix information per carrier bandwidth part may be signaled in DL and UL, respectively. For example, the value of $\mu$ and cyclic prefix information per DL carrier bandwidth part may be signaled though DL-BWP-mu and DL-MWP-cp corresponding to higher layer signaling. As another example, the value of $\mu$ and cyclic prefix information per UL carrier bandwidth part may be signaled though UL-BWP-mu and UL-MWP-cp corresponding to higher layer signaling.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

1.3. Frame Structure

DL and UL transmissions are configured with a frame with a length of 10 ms. The frame may include 10 subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may include two half-frames with the same size. In this case, the two half-frames may include subframes 0 to 4 and subframes 5 to 9, respectively.

Regarding the subcarrier spacing $\mu$, slots may be numbered within one subframe in the following ascending order: $n_s^\mu \in \{0, \ldots, N_{slot}^{subframe,\mu}-1\}$ and may also be numbered within one frame in the following ascending order: $n_{s,f}^\mu \in \{0, \ldots N_{slot}^{frame,\mu}-1\}$. In this case, the number of consecutive OFDM symbols in one slot ($N_{symb}^{slot}$) may be determined as shown in the following table according to the cyclic prefix. The start slot ($n_s^\mu$) in one subframe is aligned with the start OFDM symbol ($n_s^\mu N_{symb}^{slot}$) in the same subframe in the time dimension. Table 2 shows the number of OFDM symbols in each slot/frame/subframe in the case of the normal cyclic prefix, and Table 3 shows the number of OFDM symbols in each slot/frame/subframe in the case of the extended cyclic prefix.

TABLE 2

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 3

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present disclosure may be applied, a self-contained slot structure may be applied based on the above-described slot structure.

Figure 2:
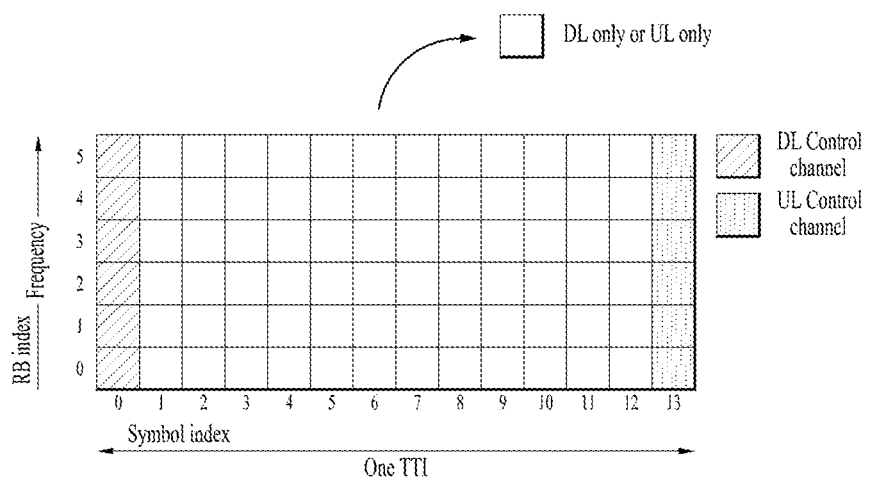
FIG. 2 is a diagram illustrating a self-contained subframe structure applicable to the present disclosure.

FIG. 2 is a diagram illustrating a self-contained slot structure applicable to the present disclosure.

In FIG. 2, the hatched area (e.g., symbol index=0) indicates a downlink control region, and the black area (e.g., symbol index=13) indicates an uplink control region. The remaining area (e.g., symbol index=1 to 13) may be used for DL or UL data transmission.

Based on this structure, a BS and a UE may sequentially perform DL transmission and UL transmission in one slot. That is, the BS and UE may transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the BS and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions may be selectively included in the self-contained slot structure. In other words, the self-contained slot structure according to the present disclosure may include either the DL control region or the UL control region as well as both the DL and UL control regions as shown in FIG. 2.

In addition, for example, the slot may have various slot formats. In this case, OFDM symbols in each slot may be divided into downlink symbols (denoted by 'D'), flexible symbols (denoted by 'X'), and uplink symbols (denoted by 'U').

Thus, the UE may assume that DL transmission occurs only in symbols denoted by 'D' and 'X' in the DL slot. Similarly, the UE may assume that UL transmission occurs only in symbols denoted by 'U' and 'X' in the UL slot.

1.4. Analog beamforming

In a millimeter wave (mmW) system, since a wavelength is short, a plurality of antenna elements may be installed in the same area. That is, considering that the wavelength at 30 GHz band is 1 cm, a total of 100 antenna elements may be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element may include a transceiver unit (TXRU) to enable adjustment of transmission power and phases per antenna element. By doing so, each antenna element may perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

Figure 3:
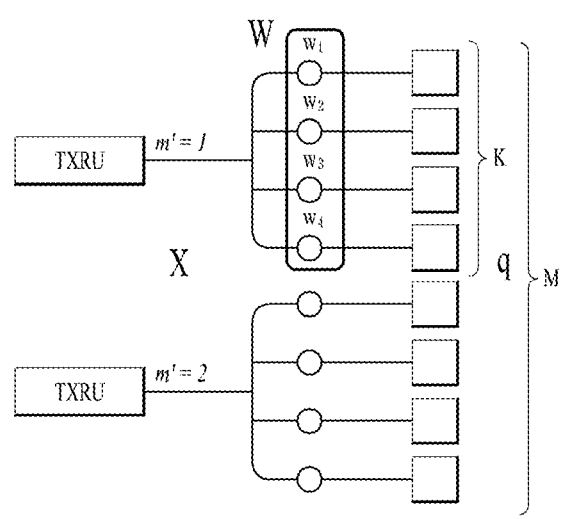
FIGS. 3 and 4 are diagrams illustrating representative connection methods for connecting TXRUs to antenna elements.
Figure 4:
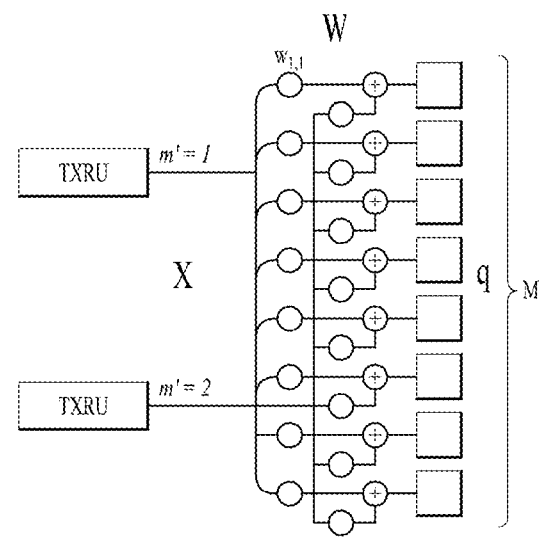

FIGS. 3 and 4 are diagrams illustrating representative methods for connecting TXRUs to antenna elements. Here, the TXRU virtualization model represents the relationship between TXRU output signals and antenna element output signals.

FIG. 3 shows a method for connecting TXRUs to sub-arrays. In FIG. 3, one antenna element is connected to one TXRU.

Meanwhile, FIG. 4 shows a method for connecting all TXRUs to all antenna elements. In FIG. 4, all antenna element are connected to all TXRUs. In this case, separate addition units are required to connect all antenna elements to all TXRUs as shown in FIG. 4.

In FIGS. 3 and 4, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 3 has a disadvantage in that it is difficult to achieve beamforming focusing but has an advantage in that all antennas may be configured at low cost.

On the contrary, the configuration shown in FIG. 4 is advantageous in that beamforming focusing may be easily achieved. However, since all antenna elements are connected to the TXRU, it has a disadvantage of high cost.

When a plurality of antennas are used in the NR system to which the present disclosure is applicable, the hybrid beamforming method obtained by combining the digital beamforming and analog beamforming may be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure may be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 5:
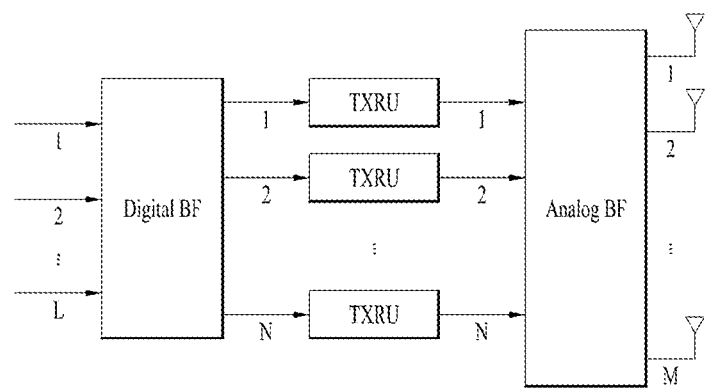
FIG. 5 is a schematic diagram illustrating a hybrid beamforming structure according to an embodiment of the present disclosure from the perspective of TXRUs and physical antennas.

FIG. 5 is a schematic diagram illustrating a hybrid beamforming structure according to an embodiment of the present disclosure from the perspective of TXRUs and physical antennas. In FIG. 5, it is assumed that the number of digital beams is L and the number of analog beams is N.

Additionally, a method for providing efficient beamforming to UEs located in a specific area by designing a BS capable of changing analog beamforming on a symbol basis has been considered in the NR system to which the present disclosure is applicable. Further, a method of introducing a plurality of antenna panels where independent hybrid beamforming may be applied by defining N TXRUs and M RF antennas as one antenna panel has also been considered in the NR system to which the present disclosure is applicable.

When the BS uses a plurality of analog beams as described above, each UE has a different analog beam suitable for signal reception. Thus, the beam sweeping operation where the BS applies a different analog beam per symbol in a specific subframe (SF) (at least with respect to synchronization signals, system information, paging, etc.) and then perform signal transmission in order to allow all UEs to have reception opportunities has been considered in the NR system to which the present disclosure is applicable.

Figure 6:
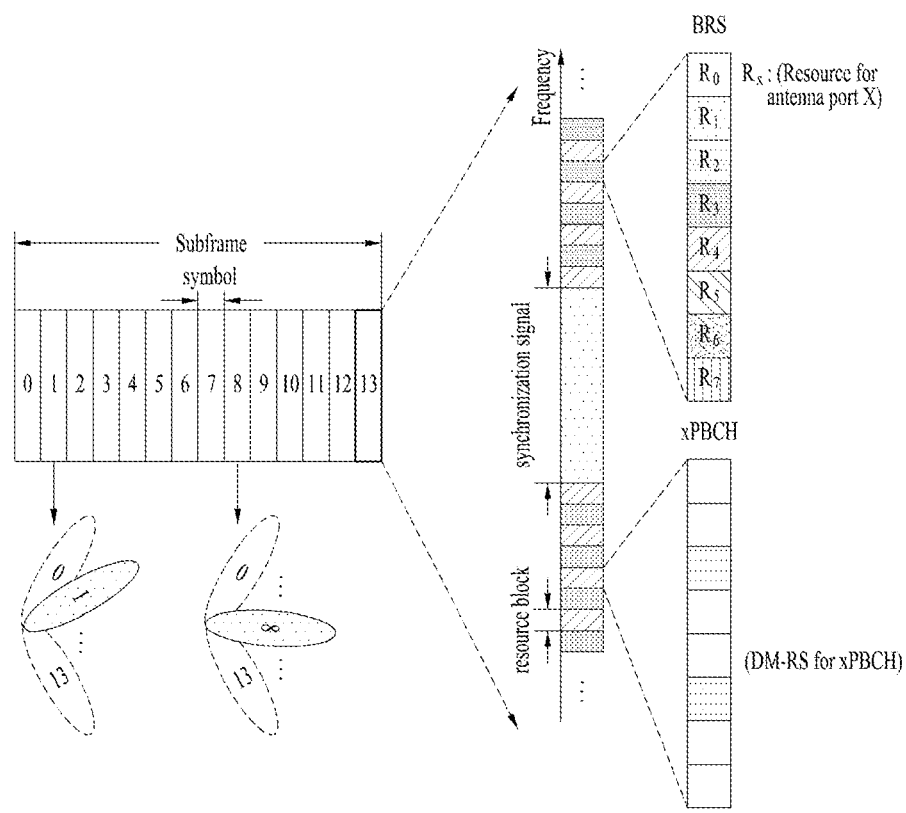
FIG. 6 is a diagram schematically illustrating the beam sweeping operation for synchronization signals and system information during a downlink (DL) transmission process according to an embodiment of the present disclosure.

FIG. 6 is a diagram schematically illustrating the beam sweeping operation for synchronization signals and system information during a downlink (DL) transmission process according to an embodiment of the present disclosure In FIG. 6, a physical resource (or channel) for transmitting system information of the NR system to which the present disclosure is applicable in a broadcasting manner is referred to as a physical broadcast channel (xPBCH). In this case, analog beams belonging to different antenna panels may be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present disclosure is applicable. The BRS may be defined for a plurality of antenna ports, and each BRS antenna port may correspond to a single analog beam. In this case, unlike the BRS, all analog beams in the analog beam group may be applied to the synchronization signal or xPBCH unlike the BRS to assist a random UE to correctly receive the synchronization signal or xPBCH.

1.5. PT-RS (Phase Tracking Reference Signal)

Hereinafter, phase noise will be described. Jitter, which occurs in the time domain, may appear as phase noise in the frequency domain. Such phase noise randomly changes the phase of a received signal in the time domain as shown in the following equation.

$$r_n = s_n e^{j\phi_n} \quad \text{[Equation 1]}$$

$$\text{where } s_n = \sum_{k=0}^{N-1} d_k e^{j2\pi \frac{kn}{N}}$$

In Equation 1, the parameters $r_n$, $s_n$, $d_k$, $\phi_n$ indicate a received signal, a time-domain signal, a frequency-domain signal, and a phase rotation value due to phase noise, respectively. When the DFT (discrete Fourier transform) process is applied the received signal in Equation 1, Equation 2 is obtained.

$$y_k = d_k \frac{1}{N}\sum_{n=0}^{N-1} e^{j\phi_n} + \frac{1}{N}\sum_{\substack{t=0 \\ t \neq k}}^{N-1} d_t \sum_{n=0}^{N-1} e^{j\phi_n} e^{j2\pi(t-k)m/N} \quad \text{[Equation 2]}$$

In Equation 2, the parameters $$\frac{1}{N}\sum_{n=0}^{N-1} e^{j\phi_n}, \frac{1}{N}\sum_{\substack{t=0 \\ t \neq k}}^{N-1} d_t \sum_{n=0}^{N-1} e^{j\phi_n} e^{j2\pi(t-k)m/N}$$

indicate common phase error (CPE) and inter-cell interference (ICI), respectively. In this case, as phase noise correlation increases, the value of the CPE in Equation 2 increases. Such CPE may be considered as a kind of carrier frequency offset in a WLAN system, but from the perspective of the UE, the CPE and CFO could be interpreted as to be similar to each other.

By performing CPE/CFO estimation, the UE may eliminate CPE/CFO corresponding to phase noise in the frequency domain. In addition, to correctly decode a received signal, the UE should perform the CPE/CFO estimation before decoding the received signal. Accordingly, the eNB may transmit a certain signal to the UE in order for the UE to perform the CPE/CFO estimation accurately. That is, the main purpose of such a signal is to estimate phase noise. To this end, a pilot signal previously shared between the eNB and UE may be used, or a data signal may be changed or duplicated. In this specification, a series of signals for estimating phase noise are commonly called the phase compensation reference signal (PCRS), phase noise reference signal (PNRS), or phase tracking reference signal (PT-RS). Hereinafter, for convenience of description, all of them are referred to as the PT-RS.

1.5.1. Time-Domain Pattern (or Time Density)

Figure 7:
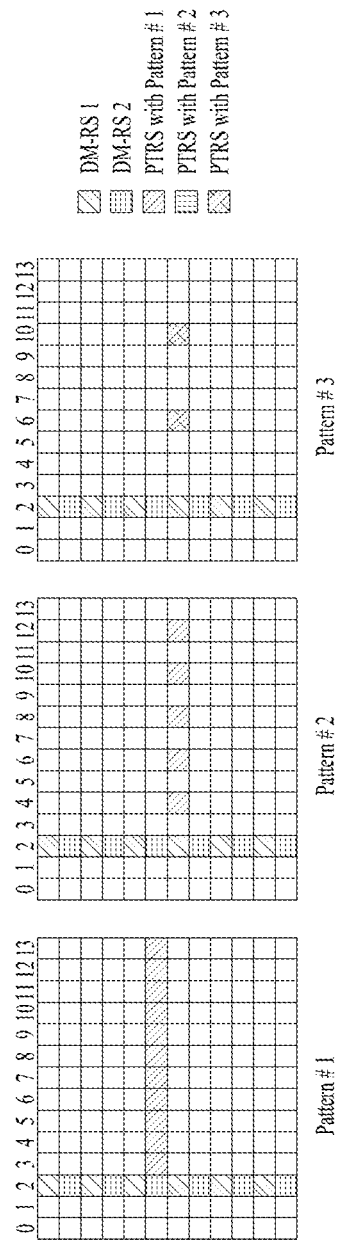
FIG. 7 is a diagram illustrating PT-RS time-domain patterns applicable to the present disclosure.

FIG. 7 is a diagram illustrating PT-RS time-domain patterns applicable to the present disclosure.

As shown in FIG. 7, the PT-RS may have different patterns depending on the applied modulation and coding scheme (MCS) level.

TABLE 4

| MCS level | PT-RS time pattern |
| --- | --- |
| (64QAM, CR = 1/3) <= MCS < (64QAM, CR = 1/2) | #3 |
| (64QAM, CR = 1/2) <= MCS < (64QAM, CR = 5/6) | #2 |
| (64QAM, CR = 5/6) <= MCS | #1 |

As shown in FIG. 7 and Table 4, the PT-RS mapping pattern may differ according to the applied MCS level.

If this configuration is generalized, the PT-RS time-domain pattern (or time density) may be defined as shown in the following table.

TABLE 5

| Scheduled MCS | Time density ($L_{PT-RS}$) |
| --- | --- |
| $I_{MCS}$ < ptrs-MCS$_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

In this case, the time densities of 1, 2, and 4 may correspond to patterns #1, #2, and #3 of FIG. 7, respectively.

In this configuration, ptrs-MCS1, ptrs-MCS2, ptrs-MCS3, and ptrs-MCS4 may be defined through higher layer signaling.

1.5.2. Frequency-Domain Pattern (or Frequency Density)

According to the present disclosure, the PT-RS may be mapped to one subcarrier every one resource block (RB), one subcarrier every two RBs, or one subcarrier every four RBs for transmission thereof. In this case, the frequency-domain pattern (or frequency density) of the PT-RS may be configured according to scheduled bandwidth.

For example, the frequency density may be determined as shown in Table 6 according to the scheduled bandwidth.

TABLE 6

| Scheduled BW | Frequency density |
|---|---|
| $0 < N_{RB} <= 4$ | No PT-RS |
| $5 < N_{RB} <= 8$ | 1 |
| $9 < N_{RB} <= 16$ | 1/2 |
| $17 < N_{RB} <= 32$ | 1/4 |

In this case, frequency density of 1 may correspond to a frequency-domain pattern where the PT-RS is mapped to one subcarrier in each RB, frequency density of ½ may correspond to a frequency-domain pattern where the PT-RS is mapped to one subcarrier in every two RBs, and frequency density of ¼ may correspond to a frequency-domain pattern where the PT-RS is mapped to one subcarrier in every four RBs.

If this configuration is generalized, the frequency-domain pattern (or frequency density) of the PT-RS may be defined as shown in the following table.

TABLE 7

| Scheduled bandwidth | Frequency density ($K_{PT-RS}$) |
|---|---|
| $N_{RB} < N_{RB0}$ | PT-RS is not present |
| $N_{RB0} \le N_{RB} < N_{RB1}$ | 2 |
| $N_{RB1} \le N_{RB}$ | 4 |

In this case, the frequency density of 2 may correspond to the frequency-domain pattern where the PT-RS is mapped to one subcarrier in every two RBs, and the frequency density of 4 may correspond to the frequency-domain pattern where the PT-RS is mapped to one subcarrier in every four RBs.

In this configuration, $N_{RB0}$ and $N_{RB1}$, which are reference values of scheduled bandwidths for determining the frequency density, may be defined through higher layer signaling.

1.5.3. DM-RS Port Configuration

Figure 8:
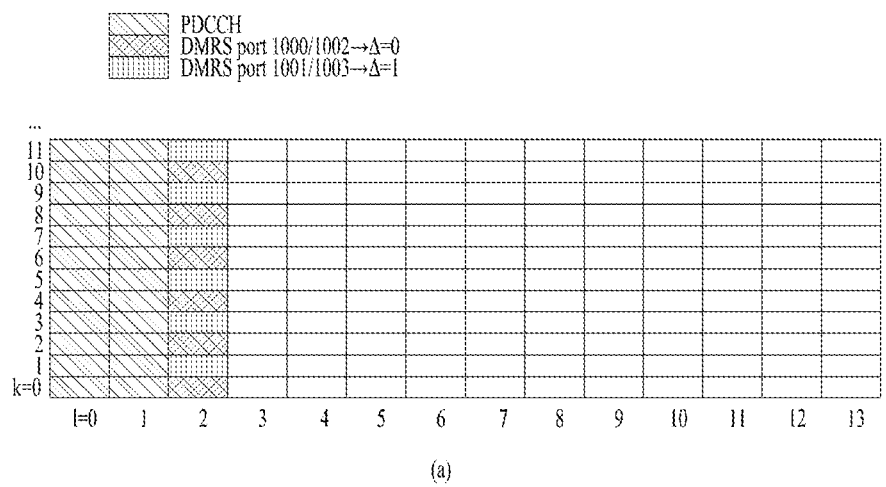
FIG. 8 is a diagram schematically illustrating an example of configuring DM-RS ports applicable to the present disclosure.
Figure 8:
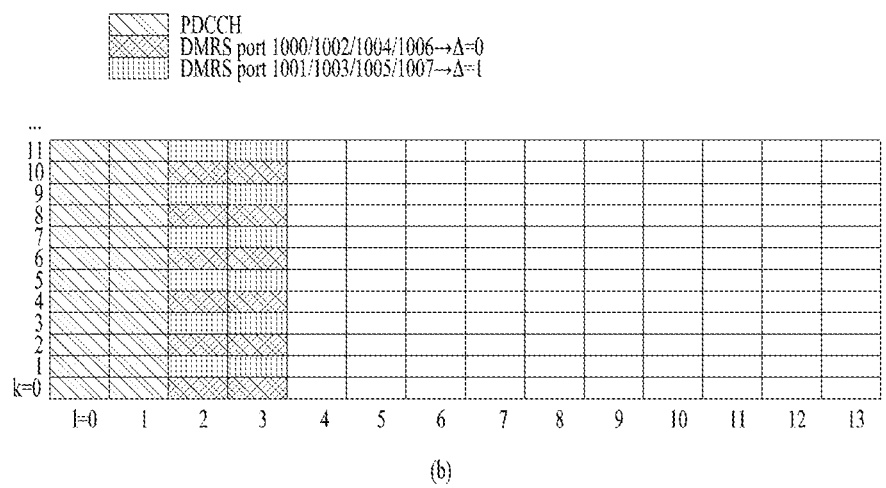

FIG. 8 is a diagram schematically illustrating an example of configuring DM-RS ports applicable to the present disclosure.

Specifically, FIG. 8(*a*) shows a structure where the DM-RS is front loaded with one symbol (front loaded DM-RS with one symbol), and FIG. 8(*b*) shows a structure where the DM-RS is front loaded with two symbols (front loaded DM-RS with two symbols).

In FIG. 8, Δ is the DM-RS offset value in the frequency domain. In this case, DM-RS ports with the same Δ may be code division multiplexed in the frequency domain (CDM-F) or code division multiplexed in the time domain (CDM-T). In addition, CDM-F may also be applied to DM-RS ports with different Δ.

In FIG. 8, the FDM or CDM-F may be applied to port #1000 to #1003. In addition, ports #1004 to #1007 may be code division multiplexed with ports #1000 to #1003 in the time domain.

Based on the DM-RS port configuration shown in FIG. 8, the eNB may provide the DM-RS port configuration through downlink control information defined as shown in the following table.

In the following table, P0 to P7 may correspond to ports #1000 to #1007, respectively, and each of values 4, 5, 7, and 9 may indicate that DM-RS ports are code division multiplexed in the time domain (CDM-T).

TABLE 8

| value | message | |
|---|---|---|
| # | # of layers | antenna port(s) |
| 0 | 1 layer | P0 |
| 1 | 1 layer | P1 |
| 2 | 1 layer | P2 |
| 3 | 1 layer | P3 |
| 4 | 2 layer | P0/P1 |
| 5 | 2 layer | P2/P3 |
| 4 | 2 layer | P0/P4 |
| 5 | 2 layer | P1/P5 |
| 6 | 3 layer | P0/P1/P2 |
| 7 | 3 layer | P0/P1/P4 |
| 8 | 4 layer | P0/P1/P2/P3 |
| 9 | 4 layer | P0/P1/P2/P4 |

Upon receiving DCI based on Table 8 above, a UE may obtain DM-RS port configuration information configured by a BS.

1.6. DCI Format in NR System

The NR system to which the present disclosure is applicable may support the following DCI formats. Specifically, the NR system may support DCI format 0_0 and DCI format 0_1 for PUSCH scheduling and support DCI format 1_0 and DCI format 1_1 for PDSCH scheduling. In addition, the NR system may additionally support DCI format 2_0, DCI format 2_1, DCI format 2_2, and DCI format 2_3 for other purposes.

DCI format 0_0 may be used to schedule a transmission port (TB)-based (or TB-level) PUSCH, and DCI format 0_1 may be used to schedule the TB-based (or TB-level) PUSCH or a code block group (CBG)-based (or CBG-level) PUSCH (when CBG-based signal transmission and reception are configured).

DCI format 1_0 may be used to schedule a TB-based (or TB-level) PDSCH, and DCI format 1_1 may be used to schedule the TB-based (or TB-level) PDSCH or a CBG-based (or CBG-level) PDSCH (when the CBG-based signal transmission and reception are configured).

DCI format 2_0 may be used to notify a slot format. DCI format 2_1 may be used to notify PRB(s) and OFDM symbol(s) where a UE assumes that no transmission is intended for the UE. DCI format 2_2 may be used to transmit transmission power control (TPC) commands for the PUCCH and the PUSCH. DCI format 2_3 may be used to transmit a group of TPC commands for SRS transmission at one or more UEs.

The details of the DCI formats may be found in 3GPP TS 28.212. That is, the features of the DCI formats which are not described in the present disclosure may be found in the specification. In addition, the definitions of all terms used herein may also found in the specification.

2. Proposed Embodiments

Hereinafter, the configurations according to the present disclosure will be described in detail based on the above-described technical features.

Particularly, a description will be given of a method of transmitting and receiving a DL PT-RS between a UE and a BS and a method of transmitting and receiving a UL PT-RS between a UE and a BS.

2.1. DL PT-RS Transmission and Reception Method

Figure 9:
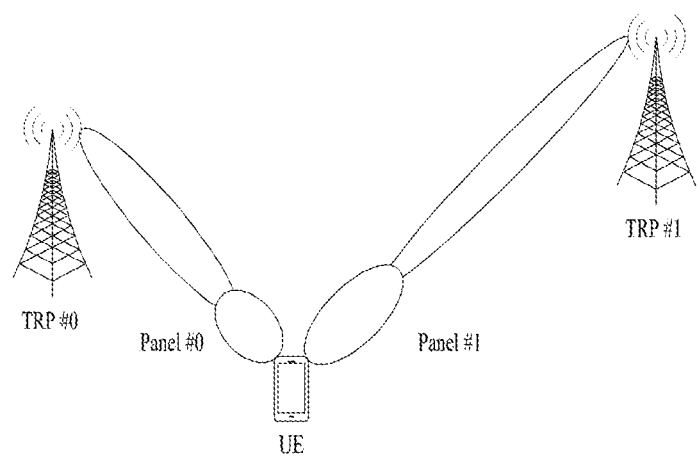
FIG. 9 is a diagram schematically illustrating a case where a single UE is connected to different TRPs and receives signals therefrom.

FIG. 9 is a diagram schematically illustrating a case where a UE is connected to different transmission and reception points (TRPs) and receives signals therefrom.

In this section, it is assumed that a UE receives PT-RSs from a plurality of DM-RS port groups as shown in FIG. 9.

In some embodiments, each of the plurality of DM-RS port groups may correspond to each TRP.

Herein, the TRP may refer to a technical configuration in which different signals are transmitted to panels of a UE. For the TRP, the following configurations may be applied: a configuration in which physical division is allowed (e.g., physically divisible BSs); or a configuration in which a UE uses different panels for signal transmission and reception although physical division is not allowed.

Herein, a PT-RS power boosting level may refer to the power ratio of PT-RS energy per resource element (EPRE) to PDSCH EPRE (i.e., the power ratio of PT-RS EPRE per layer (port) to PDSCH EPRE per layer (port)).

Specifically, when the PT-RS power boosting level is set to N dB, it may mean that the transmission power of a specific PT-RS port is boosted by N dB compared to the transmit power of a single layer of the PDSCH. In this case, the layer of the PDSCH may be the same as or correspond to a layer in which the PT-RS is transmitted.

According to the present disclosure, when a UE receives PT-RSs from a plurality of DM-RS port groups (e.g., two DM-RS port groups), the UE may be configured with a plurality of PT-RS ports. In this case, each PT-RS port may correspond to each of the DM-RS port groups.

A DM-RS port group associated with a PT-RS may borrow (or use) the transmission power of all layers to transmit the PT-RS. However, depending on implementation, this operation may not be enabled at all times.

In particular, a plurality of DM-RS port groups (e.g., two DM-RS port groups) may have different hardware structures. For example, while one DM-RS port group may support full digital beamforming, another DM-RS port group may support only analog beamforming. In this case, a different DL PT-RS power boosting level or a different power boosting factor may be configured for each DM-RS port group.

Thus, according to the present disclosure, a BS may inform a UE of the presence of the PT-RS power boosting and power boosting levels based on layers of each DM-RS port group through higher layer signaling (e.g., RRC, MAC-CE) or DCI.

As described above, when a specific UE is configured with (or assigned) a plurality of PT-RS ports (e.g., two PT-RS ports), a PT-RS power boosting level may be determined based on the number of DM-RS ports (or layers) within a DM-RS port group associated with a corresponding PT-RS (i.e., the number of DM-RS ports (or PDSCH layers) within the DM-RS port group containing a DM-RS port associated with the corresponding PT-RS port). For example, when a PT-RS power boosting level (A) is determined based on the number of layers within a DM-RS port group associated with a related (or corresponding) PT-RS and the total number of PT-RS ports, the PT-RS power boosting level (A) may satisfy Equation 3 below.

Herein, the term "corresponding to X" may be interpreted as the term "related to X" or the term "associated with X".

$$A = 10 \times \log_{10}(N_{PTRS}) + \alpha \text{(dB)} \quad \text{[Equation 3]}$$

In Equation 3, $N_{PTRS}$ denotes the number of PT-RS ports configured for a UE, and a denotes a PT-RS power boosting level based on the number of layers in each DM-RS port group (indicated through higher layer signaling or DCI).

For example, a may satisfy Equation 4 below.

$$a = 10 \times \log_{10}(N_{PDSCH}) \text{(dB)} \quad \text{[Equation 4]}$$

In Equation 4, $N_{PDSCH}$ denotes the number of PDSCH layers in a related (or corresponding) DM-RS port group.

As another example, the value of a, which depends on the number of PDSCH layers within the related (or corresponding) DM-RS port group, may be set to 0 dB by higher layer signaling or DCI. Alternatively, a may have a predetermined value (e.g., 3 dB) for all layers (or ranks) except when the number of layers (or ranks) is 1.

As described above, the value of a may be variously changed by higher layer signaling or DCI. Considering a case in which the value of a is set to 0 dB in Equation 4 or for all layers, whether PT-RS power boosting based on the number of PDSCH layers is applied or not may be turned on/off by higher layer signaling or DCI.

That is, it may be interpreted to mean that the presence of the PT-RS power boosting based on the number of PDSCH layers may be turned on/off by the RRC configuration of the BS. In other words, regarding the PT-RS power boosting level (A) satisfying Equation 3, PT-RS power boosting based on the number of PT-RS ports is basically applied, but whether the PT-RS power boosting based on the number of PDSCH layers (a in Equation 3) is applied or not may be configured differently depending on the RRC configuration.

In this case, the BS may configure the presence of the PT-RS power boosting based on the number of PDSCH layers in each DM-RS port group separately for each DM-RS port group through RRC singling (or DCI). Alternatively, the BS may configure the presence of the PT-RS power boosting based on the number of PDSCH layers in each DM-RS port group commonly for all DM-RS port groups through RRC signaling (or DCI).

For example, it is assumed that the UE in FIG. 9 are configured with two PT-RS ports, $N_1$ PDSCH layers are included in a first DM-RS port group (e.g., TRP #0), and $N_2$ PDSCH layers are included in a second DM-RS port group (e.g., TRP #1).

In this case, the BS may configure the presence of the PT-RS power boosting based on the number of PDSCH layers separately for each of the first and second DM-RS port group through RRC signaling (e.g., an epre-RATIO).

For example, the BS may configure the PT-RS power boosting based on the number of PDSCH layers for the first DM-RS port group but not configure the PT-RS power boosting based on the number of PDSCH layers for the second DM-RS port group.

In this case, the UE may assume that a PT-RS received from the first DM-RS port group (or a PT-RS corresponding to the first DM-RS port group) is received at a power boosting level (e.g., $P_1$) that satisfies Equation 5 and a PT-RS received from the second DM-RS port group (or a PT-RS corresponding to the second DM-RS port group is received at a power boosting level (e.g., $P_2$) that satisfies Equation 6.

$$P_1(\text{dB}) = 3 + 10 \times \log_{10}(N_1)(\text{dB}) \quad \text{[Equation 5]}$$

$$P_2(\text{dB}) = 3(\text{dB}) \quad \text{[Equation 6]}$$

As described above, the PT-RS power boosting level according to the present disclosure may refer to the power ratio of PT-RS EPRE to PDSCH EPRE (i.e., the power ratio of PT-RS EPRE per layer (port) to PDSCH EPRE per layer (port)). When $P_1$ and $P_2$ have positive values, it may mean that PT-RS transmission power is greater than PDSCH transmission power. In other words, when the power boosting levels, $P_1$ and $P_2$ have positive values, $P_1$ and $P_2$ may indicate how many times greater the PT-RS transmission power is than the PDSCH transmission power.

In an embodiment of the present disclosure, whether the PT-RS power boosting level based on the number of PDSCH layers is applied depending on RRC signaling (e.g., an epre-RATIO (or a PDSCH-to-PT-RS EPRE ratio) may be summarized as shown in Table 11 below. Referring to Table 11, when the value of the epre-RATIO is set to '00', it may mean that the PT-RS power boosting level based on the number of PDSCH layers in a specific DM-RS port group is applied. When the value of the epre-RATIO is set to '01', it may mean that the PT-RS power boosting level based on the number of PDSCH layers in the specific DM-RS port group is not applied.

TABLE 11

| PDSCH-to-PT-RS EPRE ratio for PT-RS port i | The number of PDSCH layers within the DMRS port group containing DMRS port associated with the PT-RS port i, $(n_{DMRS}^{PTRS,\ i})$ | | | | | |
|---|---|---|---|---|---|---|
| | 1 | 2 | 3 | 4 | 5 | 6 |
| 0 | 0 | 3 | 4.77 | 6 | 7 | 7.78 |
| 1 | 0 | 0 | 0 | 0 | 0 | 0 |
| 2 | | | | reserved | | |
| 3 | | | | reserved | | |

Continuing to refer to Table 11, when the value of the epre-RATIO is '10 (or 2)' or '11 (or 3)', the PT-RS power boosting level based on the number of PDSCH layers in the specific DM-RS port group may be fixed for a predetermined number of layers or more. For example, when the value of the epre-RATIO is '10 (or 2)' or '11 (or 3)', the PT-RS power boosting level based on the number of PDSCH layers in the specific DM-RS port group may be fixed to a specific value (e.g., 3 dB) if there are two or more layers. However, this is merely exemplary, and the present disclosure is not limited thereto.

That is, according to the present disclosure, the BS may configure DL PT-RS power boosting level configuration information per DM-RS port group for the UE through the higher layer parameter epre-RATIO as described above.

In the above configuration, a group of (PDSCH) layers are defined as one DM-RS port group, and thus, it may be difficult for the BS to separately indicate a different DL PT-RS power boosting levels for a specific TRP. In other words, although the UE may receive the higher layer parameter epre-RATIO for each DM-RS port group from the BS, the UE may be incapable of clearly recognizing which TRP the received epre-RATIO is for.

Accordingly, the present disclosure additionally proposes a method by which a BS informs which DM-RS port group (or which TRP) each of a plurality of epre-RATIOs configured by the BS is applied to.

For example, the BS may use a transmission configuration indicator (TCI) to explicitly inform the UE of the epre-RATIO for each DM-RS port group.

The TCI may refer to information for informing the UE a CSI-RS resource, a CSI-RS resource set, and/or a synchronization signal block (SSB) quasi-co-located (QCLed) with each DM-RS port group.

Specifically, the operation of indicating the relationship between a DM-RS port group and a CSI-RS resource (set) and/or an SSB using a format called TCI state has been defined in 3GPP NR specifications. A maximum of M TCI states may be defined, and the list thereof may be configured by a higher layer parameter, TCI-states. The BS may provide the UE one of the M TCI states through DCI. Thus, if the epre-RATIO for each DM-RS port group is defined by the TCI state, the UE may clearly know which epre-RATIO is applied to the configured DM-RS port group.

In the present disclosure, one of the following QCL types may be applied.
  'QCL-Type A': {Doppler shift, Doppler spread, average delay, delay spread}
  'QCL-Type B': {Doppler shift, Doppler spread}
  'QCL-Type C': {Doppler shift, average delay}
  'QCL-Type D': {Spatial Rx parameter}

In the following, the embodiments of the present disclosure will be described based on the QCL types.

It is assumed that two TRPs: TRP #0 and TRP #1 are defined. In this case, each TCI state may include information on RSs for one or two TRPs (or one or two DM-RS port groups) in the form of an RS set and further include the number of DL PT-RS ports and the epre-RATIO for each DM-RS port group.

For example, the M TCI states configurable for the UE may be defined as follows. It is assumed that 'QLC-Type A' is commonly applied as the QCL type for convenience of description, but the QCL type may vary in some embodiments.

1) TCI State #0
  TCI state #0-1={(CSI-RS resource #A, QCL-Type A, epre-RATIO (00)), (CSI-RS resource #B, QCL-Type A, epre-RATIO (00)), # of PT-RS ports=2}
  Alternatively,
  TCI state #0-2={(CSI-RS resource #A, QCL-Type A), (CSI-RS resource #B, QCL-Type A), # of PT-RS ports=2}
  Alternatively,
  TCI state #0-3={(CSI-RS resource #A, QCL-Type A), (CSI-RS resource #B, QCL-Type A), epre-RATIO (00), epre-RATIO (00), # of PT-RS ports=2}
2) TCI State #1
  TCI state #1-1={(CSI-RS resource #A, QCL-Type A, epre-RATIO (00)), (CSI-RS resource #B, QCL-Type A, epre-RATIO (01)), # of PT-RS ports=2}
  Alternatively,
  TCI state #1-2={(CSI-RS resource #A, QCL-Type A), (CSI-RS resource #B, QCL-Type A, epre-RATIO (01)), # of PT-RS ports=2}
  Alternatively,
  TCI state #1-3={(CSI-RS resource #A, QCL-Type A), (CSI-RS resource #B, QCL-Type A), epre-RATIO (00), epre-RATIO (01), # of PT-RS ports=2}
3) TCI State #2
  TCI state #2-1={(CSI-RS resource #A, QCL-Type A, epre-RATIO (01)), (CSI-RS resource #B, QCL-Type A, epre-RATIO (00)), # of PT-RS ports=2}
  Alternatively,
  TCI state #2-2={(CSI-RS resource #A, QCL-Type A, epre-RATIO (01)), (CSI-RS resource #B, QCL-Type A), # of PT-RS ports=2}
  Alternatively,
  TCI state #2-3={(CSI-RS resource #A, QCL-Type A), (CSI-RS resource #B, QCL-Type A), epre-RATIO (01), epre-RATIO (00), # of PT-RS ports=2}
4) TCI State #3
  TCI state #3-1={CSI-RS resource #A, QCL-Type A, # of PT-RS ports=1, epre-RATIO (00)}
  Alternatively,
  TCI state #3-2={CSI-RS resource #A, QCL-Type A, # of PT-RS ports=1}
5) TCI State #4
  TCI state #4-1={CSI-RS resource #A, QCL-Type A, # of PT-RS ports=1, epre-RATIO (01)}

6) TCI State #5
TCI state #5-1={(CSI-RS resource #A, QCL-Type A, epre-RATIO (00)), (CSI-RS resource #B, QCL-Type A, epre-RATIO (00)), # of PT-RS ports=1}
Alternatively,
TCI state #5-2={(CSI-RS resource #A, QCL-Type A), (CSI-RS resource #B, QCL-Type A), # of PT-RS ports=1}
Alternatively,
TCI state #5-3={(CSI-RS resource #A, QCL-Type A), (CSI-RS resource #B, QCL-Type A), epre-RATIO (00), epre-RATIO (00), # of PT-RS ports=1}
Alternatively,
TCI state #5-4={(CSI-RS resource #A, QCL-Type A), (CSI-RS resource #B, QCL-Type A), epre-RATIO (00), # of PT-RS ports=1}
Alternatively,
7) TCI State #6
TCI state #6-1={(CSI-RS resource #A, QCL-Type A, epre-RATIO (01)), (CSI-RS resource #B, QCL-Type A, epre-RATIO (00)), # of PT-RS ports=1}
Alternatively,
TCI state #6-2={(CSI-RS resource #A, QCL-Type A, epre-RATIO (01)), (CSI-RS resource #B, QCL-Type A), # of PT-RS ports=1}
Alternatively,
TCI state #6-3={(CSI-RS resource #A, QCL-Type A), (CSI-RS resource #B, QCL-Type A), epre-RATIO (01), epre-RATIO (00), # of PT-RS ports=1}
8) TCI State #7
TCI state #7-1={(CSI-RS resource #A, QCL-Type A, epre-RATIO (00)), (CSI-RS resource #B, QCL-Type A, epre-RATIO (01)), # of PT-RS ports=1}
Alternatively,
TCI state #7-2={(CSI-RS resource #A, QCL-Type A), (CSI-RS resource #B, QCL-Type A, epre-RATIO (01)), # of PT-RS ports=1}
Alternatively,
TCI state #7-3={(CSI-RS resource #A, QCL-Type A), (CSI-RS resource #B, QCL-Type A), epre-RATIO (00), epre-RATIO (01), # of PT-RS ports=1}
9) TCI State #8
TCI state #8-1={(CSI-RS resource #A, QCL-Type A, epre-RATIO (01)), (CSI-RS resource #B, QCL-Type A, epre-RATIO (01)), # of PT-RS ports=1}
Alternatively,
TCI state #8-2={(CSI-RS resource #A, QCL-Type A), (CSI-RS resource #B, QCL-Type A), epre-RATIO (01), epre-RATIO (01), # of PT-RS ports=1}
Alternatively,
TCI state #8-3={(CSI-RS resource #A, QCL-Type A), (CSI-RS resource #B, QCL-Type A), epre-RATIO (01), # of PT-RS ports=1}

Regarding the above-described TCI states, various values may be applied to CSI-RS resource #A and CSI-RS resource #B. In particular, a different value may be applied for each TCI state. For example, CSI-RS resource #A of TCI state #0 may be different from CSI-RS resource #B of TCI state #1.

Among the above TCI states, TCI state #0, TCI state #1, or TCI state #2 may represent a case in which the number of DL PT-RS ports is 2, and TCI state #3 to TCI state #8 may represent a case in which the number of DL PT-RS ports is 1.

When such a TCI state in which the number of DL PT-RS ports is 2 as TCI state #0, TCI state #1, or TCI state #2 is indicated (by DCI), the PT-RS may be transmitted to the UE at a power boosting level determined based on an epre-RATIO configured for each of the two TRPs (or DM-RS port groups), which respectively correspond to RS sets.

The above TCI state may be applied to both non-coherent joint transmission (JT) scenarios A and B.

TCI state #3 and TCI state #4 may be applied to dynamic point selection (DPS), and TCI state #5 to TCI state #8 may be applied to both non-coherent JT scenarios A and B.

In the case of TCI state #0, TCI state #1, or TCI state #2, since the number of configured PT-RS ports is 2, the epre-RATIO may be sequentially applied to the corresponding DM-RS port group for each RS set.

Specifically, in the case of TCI state #1, the UE may assume that in the first DM-RS port group corresponding to CSI-RS resource #A, the PT-RS is transmitted at a PT-RS power boosting level based on the first epre-RATIO and in the second DM-RS port group corresponding to CSI-RS resource #B, the PT-RS is transmitted at a PT-RS power boosting level based on the second epre-RATIO. If the value of the epre-RATIO is '00', the PT-RS power boosting level that satisfies Equation 5 may be applied. If the value of the epre-RATIO is '01', the PT-RS power boosting level that satisfies Equation 6 may be applied.

The value of the epre-RATIO corresponding to each DM-RS port group may be transmitted together with RS set information on each DM-RS port group.

Alternatively, the value of the epre-RATIO corresponding to each DM-RS port group may be transmitted separately from the RS set information on each DM-RS port group as in TCI state #0-3, TCI state #1-3, and TCI state #2-3. In this case, multiple epre-RATIO values may be sequentially correspond to the individual DM-RS port groups.

Alternatively, when the value of the epre-RATIO may be transmitted together with the RS set information on each DM-RS port group as in TCI state #0-2, TCI state #1-2, and TCI state #2-2, the epre-RATIO value may be defined (or transmitted) only when it is not a default value of '00'. In other words, in the case of TCI state #0-2, TCI state #1-2, and TCI state #2-2, the UE may assume that epre-RATIO='00' is applied to DM-RS port groups where there are no epre-RATIO values.

Hereinafter, TCI state #3 to TCI state #8 where the number of configured DL PT-RS ports is 1 will be described in detail.

In the case of TCI state #3-1 or TCI state #4-1, the UE may assume that the PT-RS is transmitted at a PT-RS power boosting level based on an epre-RATIO configured for a DM-RS port group corresponding to CSI-RS resource #A. Alternatively, when no epre-RATIO is defined as in TCI state #3-2, the UE may assume that epre-RATIO='00' is applied to the DM-RS port group.

When the number of configured DM-RS port groups (or RS sets) is 2 and the number of PT-RS port is 1 as in TCI state #5 to TCI state #8, a DM-RS port group for PT-RS transmission may be determined based on the MCS. Thus, the UE may assume that the DL PT-RS is transmitted at a PT-RS power boosting level determined based on an epre-RATIO corresponding to a DM-RS port group determined according to the aforementioned rules.

Specifically, in the case of TCI state #5 to TCI state #8, the UE may assume that the PT-RS is transmitted at a PT-RS power boosting level based on an epre-RATIO corresponding to one of the DM-RS port groups respectively corresponding to CSI-RS resource #A and CSI-RS resource #B. In particular, in TCI state #5-1, TCI state #6-1, TCI state #7-1, or TCI state #8-1, the epre-RATIO corresponding to each DM-RS port group may be included in a corresponding RS set.

Alternatively, when no epre-RATIO is defined in a specific RS set as in TCI state #5-2, TCI state #6-2, or TCI state #7-2, the UE may assume that epre-RATIO='00' is applied to a corresponding DM-RS port group.

Alternatively, when multiple epre-RATIOs are included (or indicated) independently of RS sets as in TCI state #5-3, TCI state #6-3, TCI state #7-3, or TCI state #8-2, the UE may assume that epre-RATIOs are sequentially applied to multiple DM-RS port groups.

Alternatively, when one epre-RATIO is included (or indicated) independently of RS sets as in TCI state #5-4 or TCI state #8-3, the UE may assume that a configured epre-RATIO is applied to all configured DM-RS port groups.

In the above example, although it is assumed that the epre-RATIO has the value of '00' or '01', the epre-RATIO may have a value of '10' or '11' (for example, when the number of layers is greater than or equal to a predetermined value, the power boosting level may be fixed to a specific value).

According to this method, the UE may accurately calculate the EPRE ratio between the PT-RS and the PDSCH for each DM-RS port group (or each TRP). In addition, upon receiving the PT-RS, the UE may know not only phase variation but also channel size variation based on the calculated EPRE ratio.

Therefore, the channel estimation performance of the UE may be improved. The UE may eliminate the PT-RS on REs where the PT-RS is received, using a channel related to the estimated PT-RS. Further, the UE may estimate the amount of interference by estimating a residual value in the remaining resource region where the PT-RS is eliminated.

Additionally, a PT-RS power boosting level applicable to PT-RS transmission in one DM-RS port group may be configured separately.

Specifically, a PT-RS corresponding to one PT-RS port may be transmitted in one specific layer. In this case, if the layer for transmitting the PT-RS has much higher transmission power than other layers, it may cause a distortion in terms of implementation. Thus, according to the present disclosure, the BS may configure the maximum PT-RS power boosting level for each of one or two DM-RS port groups configured for the UE.

For example, the BS may configure the maximum PT-RS power boosting level separately for each of the two DM-RS port groups or commonly for the two DM-RS port groups. Although the maximum PT-RS power boosting level may be set to 6 dB, the maximum PT-RS power boosting level may vary according to the configuration (e.g., DCI, RRC, etc.) of the BS. Alternatively, the maximum PT-RS power boosting level may have a default value. Specifically, if there is no separate signaling (or no configuration), the maximum PT-RS power boosting level may be set to the default value. If there is separate signaling (or a separate configuration), a value corresponding to the maximum PT-RS power boosting level may be applied.

When this configuration is applied to the aforementioned configurations, the UE may compare the PT-RS power boosting level of a specific DM-RS port group (which is determined according to the aforementioned configurations) with the maximum PT-RS power boosting level. Then, the UE may assume that in the specific DM-RS port group, the PT-RS is transmitted at a smaller PT-RS power boosting level.

In the above-described PT-RS power boosting, the magnitude of power boosting where transmission power is borrowed from other layers (i.e., PT-RS power boosting based on the number of PDSCH layers) may be limited. In other words, the BS may configure the maximum power boosting level based on the number of PDSCH layers for one or two DM-RS port groups.

Although the maximum PT-RS power boosting level based on the number of PDSCH layers may be set to 3 dB, the maximum PT-RS power boosting level may vary according to the configuration (e.g., DCI, RRC, etc.) of the BS.

When the maximum PT-RS power boosting level based on the number of PDSCH layers is not configured, the UE may recognize that there is no limitation on the maximum PT-RS power boosting level based on the number of PDSCH layers.

Alternatively, the maximum PT-RS power boosting level based on the number of PDSCH layers may have a default value. Specifically, if there is no separate signaling (or no configuration), the maximum PT-RS power boosting level based on the number of PDSCH layers may be set to the default value. If there is separate signaling (or a separate configuration), a value corresponding to the maximum PT-RS power boosting level based on the number of PDSCH layers may be applied.

When this configuration is applied to the aforementioned configurations, the UE may compare the PT-RS power boosting level based on the number of PDSCH layers among PT-RS power boosting levels of a specific DM-RS port group (which is determined according to the aforementioned configurations) with the maximum power boosting level based on the number of PDSCH layers. Then, the UE may assume that in the specific DM-RS port group, the PT-RS is transmitted at a smaller PT-RS power boosting level based on the number of layers.

The DL PT-RS transmission and reception method proposed in the present disclosure may be generalized as follows based on the above-described configurations.

(1) When the number of PT-RS ports is 1

The power boosting level (P) of a PT-RS transmitted in a specific DM-RS port group may satisfy Equation 7 below.

$$P = \min(P_{max}, X)(\text{dB})$$

$$X = \min(P_{layer,max}, a)(\text{dB}) \quad \text{[Equation 7]}$$

In Equation 7, $P_{max}$ denotes the maximum PT-RS power boosting level configured by the BS and may be set to, for example, 6 dB. $P_{layer,max}$ denotes the maximum power boosting level based on the number of PDSCH layers and may be set to, for example, 3 dB (if configured). If not configured, $P_{layer,max}$ may be set to $10 \times \log_{10}(N_{PDSCH})$ or a default value. $N_{PDSCH}$ denotes the number of PDSCH layers.

In Equation 7, a denotes a PT-RS power boosting level based on the number of PDSCH layers, which is determined based on an epre-RATIO for a DM-RS port group configured by the BS. For example, when the epre-RATIO is set to '00' or '01', a may be determined according to Table 11. As another example, when the epre-RATIO is set to '10' or '11', a may have a fixed value regardless of the number of layers if the number of PDSCH layers is greater than or equal to a predetermined value.

(2) When the number of PT-RS ports is 2

A power boosting level (P) of a PT-RS transmitted in a specific one of two DM-RS port groups may satisfy Equation 8 below.

$$P = 3 + \min(P_{max}, X)(\text{dB})$$

$$X = \min(P_{layer,max}, a)(\text{dB}) \quad \text{[Equation 8]}$$

In Equation 8, $P_{layer,max}$ denotes the maximum power boosting level based on the number of PDSCH layers and may be set to, for example, 3 dB (if configured) similarly to Equation 7. If not configured, $P_{layer,max}$ may be set to $10 \times \log_{10}(N_{PDSCH})$ or a default value. $N_{PDSCH}$ denotes the number of PDSCH layers.

In Equation 8, a denotes a PT-RS power boosting level based on the number of PDSCH layers, which is determined based on an epre-RATIO for a DM-RS port group configured by the BS. For example, when the epre-RATIO is set to '00' or '01', a may be determined according to Table 11. As another example, when the epre-RATIO is set to '10' or '11', a may have a fixed value regardless of the number of layers if the number of PDSCH layers is greater than or equal to a predetermined value.

The DL PT-RS may be transmitted and received between the DM-RS port group (or TRP corresponding thereto) and the UE based on the DL PT-RS power boosting level determined according to the above method.

3.2. UL PT-RS Transmission and Reception Method

When a UE transmits a UL PT-RS, the UE needs to report the implementation form of the UE to a BS. Therefore, according to the present disclosure, the UE may report UE capability to the BS.

To this end, the UE may transmit information on UL PT-RS power boosting suitable for the UE in the form of a UE capability report to the BS through higher layer signaling (e.g., RRC).

For example, the UE may use a UL PT-RS power boosting related parameter, which is predetermined, to report the information on the UL PT-RS power boosting suitable for the UE to the BS. The BS may determine and configure the UL PT-RS power boosting related parameter for the UE based on the received UE capability report.

In the present disclosure, when one PT-RS port is transmitted, the value of a PUSCH to PT-RS power ratio per layer per RE is assumed to be determined as A (dB). This value is assumed to be determined based on an RRC parameter (e.g., UL-PTRS-EPRE-ratio, which has a default value of '00') according to Table 12 below.

TABLE 12

| A [dB] | | # of PUSCH layers | | | |
|---|---|---|---|---|---|
| | | 1 | 2 | 3 | 4 |
| RRC parameter | 00 | 0 | 3 | 4.77 | 6 |
| | 01 | 0 | 3 | 3 | 3 |
| | 10 | 0 | 0 | 0 | 0 |
| | 11 | | Reserved | | |

In this case, if the UE is incapable of performing power boosting of 3 dB or higher based on the implemented capability (or situation) of the UE, the UE may report a value of '01' to the BS. If the UE is incapable of performing power boosting above 0 dB, the UE may report a value of '10' to the BS.

Although there is no configuration corresponding to the RRC parameter set to '11', the UE may report the RRC parameter set to '11' to the BS if the UE determines that power boosting corresponding to the RRC parameter set to '11' (which will be defined later) is suitable.

2.3. Summary

Figure 10:
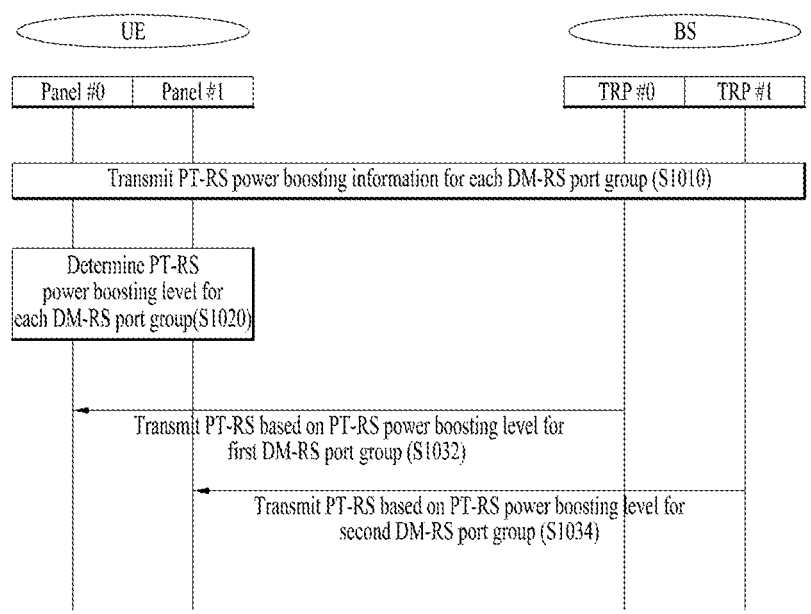
FIG. 10 is a diagram schematically illustrating a PT-RS transmission and reception method between a UE and a BS according to the present disclosure.
Figure 11:
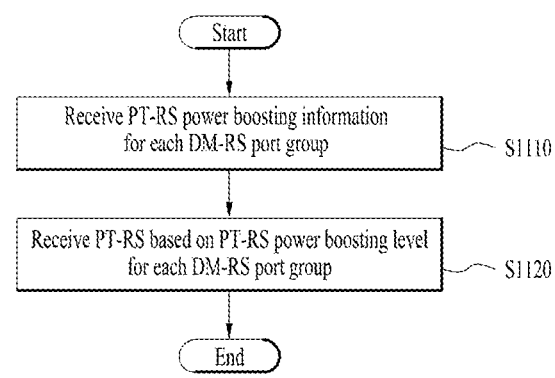
FIG. 11 is a diagram schematically illustrating a PT-RS reception method for a UE according to the present disclosure.

FIG. 10 is a diagram schematically illustrating a PT-RS transmission and reception method between a UE and a BS according to the present disclosure, and FIG. 11 is a diagram schematically illustrating a PT-RS reception method for a UE according to the present disclosure.

In this section, it is assumed that a UE is configured with two DM-RS port groups (or two TRPs) and TRP #0 and TRP #1 are related to a specific BS. Here, the BS may be a higher entity that controls TRP #0 and TRP #1 and in some embodiments, the BS may be replaced by various configurations.

The UE may receive PT-RS power boosting information for each of a plurality of DM-RS port groups from the BS (S1010 and S1110).

In an example of the present disclosure, the PT-RS power boosting information for each of the plurality of DM-RS port groups may include information on whether PT-RS power boosting based on the number of layers for each of the plurality of DM-RS port groups is applied.

In this case, the PT-RS power boosting information for each of the plurality of DM-RS port groups may be transmitted to the UE in various ways. For example, the PT-RS power boosting information for each of the plurality of DM-RS port groups may be received at panel #0 of the UE through TRP #0 or at panel #1 of the UE through TRP #1. As another example, the UE may receive the information through other configurations rather than TRP #0 and TRP #1.

Specifically, the received information may provide whether the PT-RS power boosting based on the number of layers is applied to each of the plurality of DM-RS port groups.

In another example of the present disclosure, the PT-RS power boosting information for each of the plurality of DM-RS port groups may include information implicitly/explicitly indicating a PT-RS power boosting level based on the number of layers for each of the plurality of DM-RS port groups.

Next, the UE may determine the PT-RS power boosting level of each DM-RS port group (S1020) and receive the PT-RS based on the PT-RS power boosting level of each DM-RS port group (S1032, S1034, and S1120).

When the PT-RS power boosting information for each of the plurality of DM-RS port groups includes the information on whether the PT-RS power boosting based on the number of layers for each of the plurality of DM-RS port groups is applied as described above, the UE may receive the PT-RS based on the PT-RS power boosting level of each DM-RS port group, which is determined based on the received information.

Alternatively, when the PT-RS power boosting information for each of the plurality of DM-RS port groups includes the information implicitly/explicitly indicating the PT-RS power boosting level based on the number of layers for each of the plurality of DM-RS port groups, the UE may receive the PT-RS based on the PT-RS power boosting level of each DM-RS port group, which is determined based on the received information.

The PT-RS power boosting level of a specific DM-RS port group among the plurality of DM-RS ports may refer to a power boosting level for the PT-RS transmission power of the specific DM-RS port group with respect to the transmission power of one layer of a PDSCH belonging to the specific DM-RS port group. In this case, the one layer may be a layer in which the PT-RS of the specific DM-RS port group is transmitted.

According to the present disclosure, when the PT-RS power boosting information for each of the plurality of DM-RS port groups includes the information on whether the PT-RS power boosting based on the number of layers for each of the plurality of DM-RS port groups is applied, the UE may operate as follows.

For example, when the received information indicates that the PT-RS power boosting based on the number of layers is applied to the for the specific DM-RS port group, the UE may receive the PT-RS on the assumption that the PT-RS is transmitted from the specific DM-RS port group at a PT-RS power boosting level ($P_1$) satisfying Equation 9 below.

$$P_1 = X + Y \text{(dB)} \quad \text{[Equation 9]}$$

As another example, when the received information indicates that the PT-RS power boosting based on the number of layers is not applied to the specific DM-RS port group, the UE may receive the PT-RS on the assumption that the PT-RS is transmitted from the specific DM-RS port group at a PT-RS power boosting level ($P_2$) satisfying Equation 10 below.

$$P_2 = X \text{(dB)} \quad \text{[Equation 10]}$$

In Equations 9 and 10, X denotes a PT-RS power boosting level based on the number of PT-RS ports, and Y denotes a PT-RS power boosting level based on the number of layers for the specific DM-RS port group.

When the number of PT-RS ports is 2, the value of X may be about 3 dB.

When the number of layers for the specific DM-RS port group is 2, the value of Y may be 3 dB. When the number of layers for the specific DM-RS port group is 3, the value of Y may be 4.77 dB. When the number of layers for the specific DM-RS port group is 4, the value of Y may be 6 dB.

As a further example, when the received information indicates that the PT-RS power boosting based on the number of layers is applied to the specific DM-RS port group, the UE may receive the PT-RS on the assumption that the PT-RS is transmitted from the specific DM-RS port group at a PT-RS power boosting level ($P_3$) satisfying Equation 11 below.

$$P_3 = \min(P_{MAX}, X+Y) \text{(dB)} \quad \text{[Equation 11]}$$

As still another example, when the received information indicates that the PT-RS power boosting based on the number of layers is not applied to the specific DM-RS port group, the UE may receive the PT-RS on the assumption that the PT-RS is transmitted from the specific DM-RS port group at a PT-RS power boosting level ($P_4$) satisfying Equation 12 below.

$$P_4 = \min(P_{MAX}, X) \text{(dB)} \quad \text{[Equation 12]}$$

In Equations 11 and 12, X denotes the PT-RS power boosting level based on the number of PT-RS ports, Y denotes the PT-RS power boosting level based on the number of layers for the specific DM-RS port group, $P_{MAX}$ denotes a power boosting threshold level configured by higher layer signaling. $P_{MAX}$ may be fixed to a predetermined value.

According to the present disclosure, the PT-RS power boosting information for each of the plurality of DM-RS port groups may be received through higher layer signaling.

Alternatively, the PT-RS power boosting information for each of the plurality of DM-RS port groups may be configured with a transmission configuration indicator (TCI).

In this case, the TCI may be received in DCI.

The TCI may indicate one of a plurality of predetermined TCI states for the plurality of DM-RS port groups.

The plurality of predetermined TCI states may be configured by higher layer signaling.

A parameter for informing whether the PT-RS power boosting based on the number of layers is applied, which is included in the plurality of TCI states, may be defined for each RS set corresponding to each of the plurality of DM-RS port groups.

In the above examples, the number (or index) of a PT-RS port on which the PT-RS is received from each of the plurality of DM-RS port groups may be associated with the lowest DM-RS port number (or index) among the DM-RS port groups. As an example, when the UE receives PT-RSs from two DM-RS port groups (i.e., a first DM-RS port group and a second DM-RS port group) respectively, the UE may assume that a first PT-RS port is associated with a DM-RS port with the lowest number (DM-RS port index #0) in the first DM-RS port group and a second PT-RS port is associated with a DM-RS port with the lowest number (DM-RS port index #1) in the second DM-RS port group and receive the PT-RSs on the first and second PT-RS ports.

According to the above configuration, since the BS may dynamically determine the PT-RS power boosting level for each DM-RS port group (or for each TRP) in consideration of the implementation thereof, the BS may configure whether the PT-RS power boosting for each DM-RS port group (or for each TRP) is applied adaptively to various implementation examples (e.g., the PT-RS power boosting based on different layers may be allowed for TRP #0, but the PT-RS power boosting based on different layers may not be allowed for TRP #1).

In addition, the UE may receive the PT-RS by calculating (or recognizing) the PT-RS power boosting level for each DM-RS port group more accurately.

Since each of the examples of the proposed methods may be included as one method for implementing the present disclosure, it is apparent that each example may be regarded as a proposed method. Although the proposed methods may be implemented independently, some of the proposed methods may be combined (or merged) for implementation. In addition, it may be regulated that information on whether the proposed methods are applied (or information on rules related to the proposed methods) should be transmitted from a BS to a UE through a predefined signal (e.g., a physical layer signal, a higher layer signal, etc.).

3. Device Configurations

Figure 12:
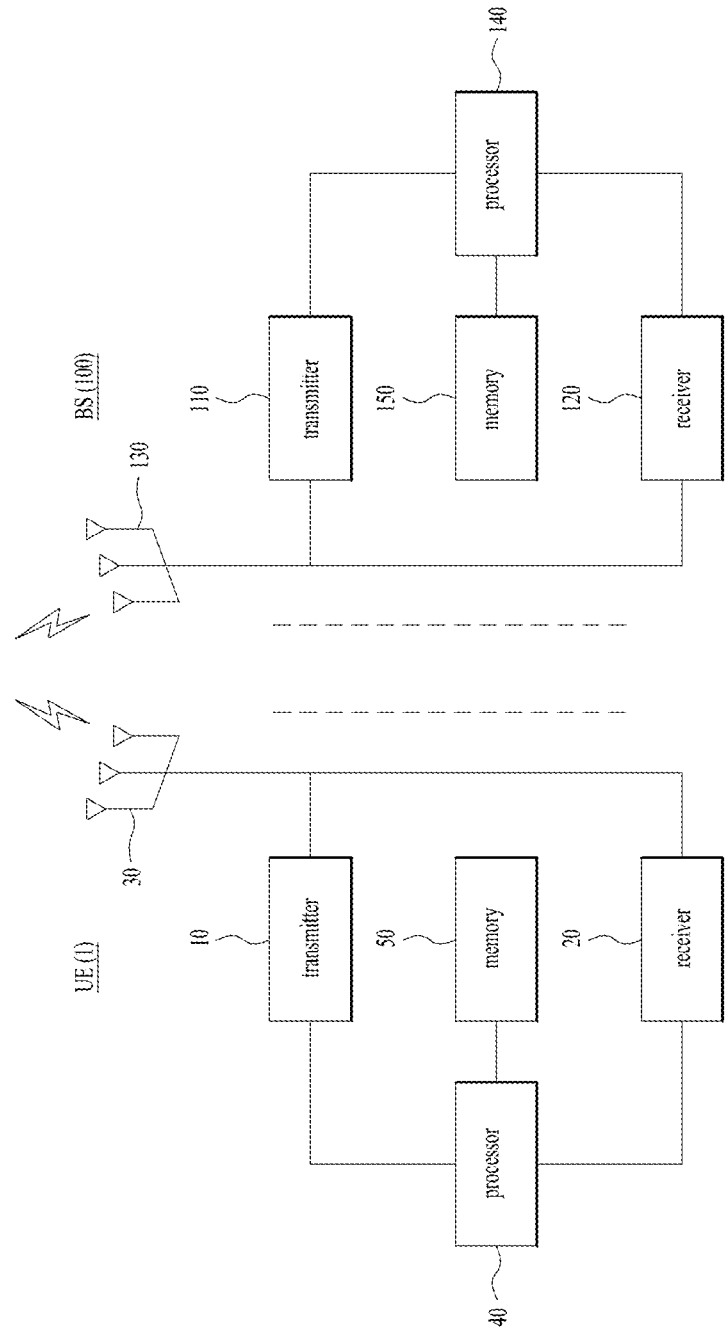
FIG. 12 is a diagram illustrating configurations of a user equipment and a base station for implementing the proposed embodiments.

FIG. 12 is a diagram illustrating the configurations of a UE and a BS for implementing the proposed embodiments. The UE and the BS illustrated in FIG. 12 may operate to implement the aforementioned embodiments of the PT-RS transmission and reception method between the UE and the BS.

The UE 1 may act as a transmission end in UL and a reception end in DL. The BS (eNB or gNB) 100 may act as a reception end in UL and a transmission end in DL.

Each of the UE and BS may include a transmitter 10/110 and a receiver 20/120 for controlling transmission and reception of information, data, and/or messages and an antenna 30/130 for transmitting and receiving information, data, and/or messages.

In addition, each of the UE and BS may include a processor 40/140 for implementing the above-described embodiments of the present disclosure and a memory 50/150 for temporarily or permanently storing processing by the processor 40/140.

With the above configuration, the UE 1 may receive, from the BS, information on whether PT-RS power boosting based on the number of layers for each of a plurality of DM-RS port groups is applied, using the processor 40 configured to control the receiver 20. In this case, the UE 1 may receive information on the number of PT-RS ports configured for the UE 1 together with the information on whether the PT-RS power boosting based on the number of layers for each of the plurality of DM-RS port groups is applied. Then, using the processor 40 configured to control the receiver 20, the UE 1 may receive a PT-RS based on a PT-RS power boosting level of each DM-RS port group. The PT-RS power boosting level of each DM-RS port group may be determined based on the received information.

The transmitter and receiver of each of the UE and BS may perform packet modulation/demodulation for data transmission, high-speed packet channel coding, OFDMA packet scheduling, time division duplex (TDD) packet scheduling, and/or channel multiplexing. Each of the UE and BS of FIG. 12 may further include a low-power radio frequency (RF)/intermediate frequency (IF) module.

The UE may be any of a personal digital assistant (PDA), a cellular phone, a personal communication service (PCS) phone, a global system for mobile (GSM) phone, a wideband code division multiple access (WCDMA) phone, a mobile broadband system (MBS) phone, a hand-held personal computer (PC), a laptop PC, a smart phone, a multi-mode multi-band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

The embodiments of the present disclosure may be achieved by various means, for example, hardware, firmware, software, or a combination thereof.

In a hardware configuration, the methods according to exemplary embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present disclosure are applicable to various wireless access systems including the 3GPP system and/or 3GPP2 system. The embodiments of the present disclosure are also applicable not only to the various wireless access systems but also to all technical fields in which the wireless access systems find their applications. Further, the proposed method may also be applied to a mmWave communication system using ultra-high frequency bands.

The invention claimed is:

1. A method for receiving phase tracking reference signal (PT-RS) by a user equipment (UE) in a wireless communication system, the method comprising:
    receiving downlink control information including a transmission configuration indication (TCI);
    receiving, via radio resource control (RRC) signaling, configuration information for a PT-RS; and
    receiving the PT-RS through a PT-RS port based on (i) a ratio of PT-RS energy per resource element (EPRE) to PDSCH EPRE per layer per RE for the PT-RS port and (ii) a TCI state,
    wherein the TCI indicates the TCI state based on the configuration information, and
    wherein the ratio is determined according to the configuration information based on the number of layers in a physical downlink shared channel (PDSCH).

2. The method of claim 1, wherein a ratio of PT-RS EPRE to PDSCH EPRE per layer per RE of a specific DM-RS port group is a ratio of PT-RS EPRE to PDSCH EPRE per layer per RE for PT-RS transmission power of the specific DM-RS port group with respect to transmission power of one layer of a physical downlink shared channel (PDSCH) belonging to the specific DM-RS port group.

3. The method of claim 1, wherein the received configuration information informs whether PT-RS power boosting based on the number of layers for each of a plurality of DM-RS port groups are applied, respectively.

4. The method of claim 3,
    wherein based on the received configuration information informing that PT-RS power boosting based on the number of layers for specific DM-RS port group is applied, the PT-RS received from the specific DM-RS port group is received based on power boosting level (P1) satisfying $$P_1 = X + Y \text{(dB)} \qquad \text{[Equation 1]}$$

wherein based on the received configuration information informing that PT-RS power boosting based on the number of layers for the specific DM-RS port group is not applied, the PT-RS received from the specific DM-RS port group is received based on power boosting level (P2) satisfying $$P_2 = X \text{(dB)} \qquad \text{[Equation 2]}$$

wherein X denotes a ratio of PT-RS EPRE to PDSCH EPRE per layer per RE based on a number of PT-RS ports, Y denotes the ratio of PT-RS EPRE to PDSCH EPRE per layer per RE based on the number of layers for the specific DM-RS port group.

5. The method of claim 4, wherein based on that the number of PT-RS ports is 2, the value of X is 3 dB.

6. The method of claim 4, wherein based on that the number of layers for the specific DM-RS port group is 2, the value of Y is 3 dB,
    wherein based on that the number of layers for the specific DM-RS port group is 3, the value of Y is 4.77 dB, and
    wherein based on that the number of layers for the specific DM-RS port group is 4, the value of Y is 6 dB.

7. The method of claim 3, wherein based on the received configuration information informing that the PT-RS power boosting based on the number of layers is applied to a specific DM-RS port group, the PT-RS received from the specific DM-RS port group is received at a power boosting level ($P_3$) satisfying $$P_3 = \min(P_{MAX}, X+Y) \text{(dB)}, \qquad \text{[Equation 3]}$$

wherein based on the received configuration information informing that the PT-RS power boosting based on the number of layers is not applied to the specific DM-RS port group, the PT-RS received from the specific DM-RS port group is received at a power boosting level ($P_4$) satisfying $$P_4 = \min(P_{MAX}, X) \text{(dB)}, \text{ and} \qquad \text{[Equation 4]}$$

wherein X denotes a ratio of PT-RS EPRE to PDSCH EPRE per layer per RE based on a number of PT-RS ports, Y denotes a ratio of PT-RS EPRE to PDSCH EPRE per layer per RE based on a number of layers for the specific DM-RS port group, and $P_{MAX}$ denotes a power boosting threshold level configured by higher layer signaling.

8. The method of claim 1, wherein the TCI informs one of a plurality of predetermined TCI states for a plurality of DM-RS port groups.

9. The method of claim 8, wherein the plurality of predetermined TCI states are configured through higher layer signaling.

10. The method of claim 8, wherein a parameter for informing whether PT-RS power boosting based on the number of layers is applied is defined for each reference signal set corresponding to each of the plurality of DM-RS port groups, and wherein the parameter is included in the plurality of TCI states.

11. The method of claim 1, wherein the UE receives the PT-RS on the PT-RS port associated with each DM-RS port group.

12. The method of claim 11, wherein the PT-RS port associated with each DM-RS port group is associated with a DM-RS port with a lowest index among DM-RS ports assigned to each DM-RS port group.

13. A user equipment (UE) for receiving a phase tracking reference signal (PT-RS) in a wireless communication system, the UE comprising:
  a receiver; and
  a processor connected to the receiver,
  wherein the processor is configured to:
    receive downlink control information including a transmission configuration indication (TCI);
    receive, via radio resource control (RRC) signaling, configuration information for a PT-RS; and
    receive the PT-RS through a PT-RS port based on (i) a ratio of PT-RS energy per resource element (EPRE) to PDSCH EPRE per layer per RE for the PT-RS port and (ii) a TCI state,
  wherein the TCI indicates the TCI state based on the configuration information, and
  wherein the ratio is determined according to the configuration information based on the number of layers in a physical downlink shared channel (PDSCH).

14. The UE according to claim 13, wherein the UE is capable of communicating with at least one of another UE, a UE related to an autonomous driving vehicle, a base station or a network.

* * * * *